(12) United States Patent
Nakhamkin

(10) Patent No.: US 7,614,237 B2
(45) Date of Patent: Nov. 10, 2009

(54) CAES SYSTEM WITH SYNCHRONOUS RESERVE POWER REQUIREMENTS

(76) Inventor: Michael Nakhamkin, 40 Woodman La., Basking Ridge, NJ (US) 07920

( * ) Notice: Subject to any disclaimer, the term of this patent is extended or adjusted under 35 U.S.C. 154(b) by 0 days.

(21) Appl. No.: 12/285,404

(22) Filed: Oct. 3, 2008

(65) Prior Publication Data
US 2009/0100835 A1 Apr. 23, 2009

Related U.S. Application Data

(60) Continuation-in-part of application No. 12/216,911, filed on Jul. 11, 2008, now abandoned, which is a continuation of application No. 12/076,689, filed on Mar. 21, 2008, now Pat. No. 7,406,828, which is a division of application No. 11/657,661, filed on Jan. 25, 2007, now abandoned.

(51) Int. Cl.
*F02C 6/18* (2006.01)
(52) U.S. Cl. .................. 60/772; 60/39.183; 60/727
(58) Field of Classification Search ............. 60/39.181, 60/39.183, 726, 727, 728, 772
See application file for complete search history.

(56) References Cited

U.S. PATENT DOCUMENTS

| | | | |
|---|---|---|---|
| 3,631,673 | A | 1/1972 | Charrier et al. |
| 4,358,250 | A | 11/1982 | Payne |
| 4,885,912 | A | 12/1989 | Nakhamkin |
| 5,181,376 | A | 1/1993 | Rao |
| 5,442,904 | A | 8/1995 | Shnaid |
| 5,537,822 | A | 7/1996 | Shnaid et al. |
| 5,632,143 | A | 5/1997 | Fisher et al. |
| 5,934,063 | A | 8/1999 | Nakhamkin |
| 6,305,158 | B1 | 10/2001 | Nakhamkin |
| 6,745,569 | B2 | 6/2004 | Gerdes |
| 7,150,154 | B2 * | 12/2006 | Althaus et al. ........... 60/727 |

(Continued)

FOREIGN PATENT DOCUMENTS

DE 102004040890 A1 3/2005

(Continued)

OTHER PUBLICATIONS

PCT Search Report and Written Opinion in PCT/US2009/048077, dated Aug. 17, 2009.

*Primary Examiner*—Louis J Casaregola
(74) *Attorney, Agent, or Firm*—Manelli Denison & Selter PLLC; Edward J. Stemberger

(57) ABSTRACT

A CAES system (10) includes an air storage (18), a compressor (20) supplying compressed air to the air storage, a power generating structure (11, 102), a heat exchanger (24), an auxiliary combustor (27), an air expander (30), and an electric generator (32). The system operates in one of modes a) a main power production mode wherein the auxiliary combustor is inoperable and the power generating structure is operable, to produce power by the air expander, fed by the heated compressed air received from the air storage, in addition to power produced by the power generating structure, or b) a synchronous reserve power mode wherein the auxiliary combustor is operable and the power generating structure is inoperable, with compressed air withdrawn from the air storage being preheated by the auxiliary combustor that feeds the air expander, with the air expander expanding the heated air and the generator providing immediate start-up power.

5 Claims, 3 Drawing Sheets

U.S. PATENT DOCUMENTS

| | | | |
|---|---|---|---|
| 7,500,349 B2 * | 3/2009 | Althaus | 60/39.511 |
| 2003/0131599 A1 | 7/2003 | Gerdes | |
| 2008/0178602 A1 | 7/2008 | Nakhamkin | |
| 2008/0272597 A1 * | 11/2008 | Althaus | 290/52 |

FOREIGN PATENT DOCUMENTS

| | | |
|---|---|---|
| RU | 2029119 C1 | 2/1995 |
| SU | 383859 A | 8/1973 |
| WO | WO 92/22741 A1 | 12/1992 |

* cited by examiner

CAES SYSTEM WITH SYNCHRONOUS RESERVE POWER REQUIREMENTS

This application is a continuation-in-part of U.S. application Ser. No. 12/216,911 filed on Jul. 11, 2008, now abandoned which is a continuation of U.S. application Ser. No. 12/076,689, filed on Mar. 21, 2008, now U.S. Pat. No. 7,406,828, which is a division of U.S. application Ser. No. 11/657,661, filed on Jan. 25, 2007, now abandoned.

TECHNICAL FIELD

This invention relates to a Compressed Air Energy Storage (CAES) system and, more particularly, to a CAES system that can provide substantially instantaneous, synchronous reserve power.

BACKGROUND

U.S. Pat. Nos. 7,389,644 and 7,406,828 disclose a CAES plants where a compressor supplies compressed air to an air storage during off-peak hours and, during peak hours, the stored compressed air is withdrawn from the storage, is preheated by utilizing the combustion turbine exhaust gas heat, and then is directed into an expander that generates the preheated compressed air power in addition to combustion turbine power. Conventional CAES plant operations are effective in achieving the prime goal of storing off-peak energy in the form of the compressed air and then using the preheated, stored compressed air for generation of the more needed and higher priced energy during peak hours, i.e., management of renewable and base power resources.

Still, electric grids require a number of additional very important functions such as grid regulation and emergency synchronous reserve. The grid regulation is easily provided by U.S. Pat. Nos. 7,389,644 and 7,406,828 that disclose CAES plants with practically instant load following operation of the CAES plants. The emergency synchronous reserve function requires very quick start-up and power delivery. The start-up time of the CAES plants described in each of U.S. Pat. Nos. 7,389,644 and 7,406,828, the contents of which are hereby incorporated by reference into this specification, is dependent on the startup time of combustion turbines (that can take approximately 20-30 minutes) to utilize the combustion turbine exhaust gas heat.

Thus, in a CAES system, there is a need to provide practically instant synchronous reserve power independent of the combustion turbine or other power generation structure.

SUMMARY

An object of the invention is to fulfill the need referred to above. In accordance with the principles of an aspect of the present invention, this objective is achieved by providing a CAES system including a compressor for supplying compressed air to the air storage, an air storage for storing compressed air, a power generating structure, a heat exchanger constructed and arranged to receive heat from the power generating structure and to receive compressed air from the air storage, at least one auxiliary combustor for burning fuel and constructed and arranged to receive compressed air from the air storage, an air expander constructed and arranged to be fed with heated air from one of the heat exchanger or the at least one auxiliary combustor and to expand the heated air, and an electric generator, associated with the expander, for producing electric power. The system is constructed and arranged to selectively operate in at least one of the following power production modes of operation:

a) a main power production mode wherein the power generating structure is operable and the at least one auxiliary combustor is inoperable, with the heat exchanger receiving heat from the power generating structure and receiving the compressed air from the air storage so as to heat the compressed air received from the air storage, with the heat exchanger feeding the heated compressed air to the air expander, with the air expander expanding the heated compressed air and the generator providing the electric power in addition to power produced by the power generating structure, or b) a synchronous reserve power mode wherein the at least one auxiliary combustor is operable and the power generating structure is inoperable, with compressed air withdrawn from the air storage being preheated by the at least one auxiliary combustor feeding the heated compressed air to the air expander, with the air expander expanding the heated air and the generator providing substantially immediate start-up power.

In accordance with another aspect of the invention, a method of operating a CAES system is provided. The CAES system includes a compressor for supplying compressed air to the air storage, an air storage for storing compressed air, a power generating structure, a heat exchanger constructed and arranged to receive heat from the power generating structure and to receive compressed air from the air storage, at least one auxiliary combustor for burning fuel and constructed and arranged to receive compressed air from the air storage, an air expander constructed and arranged to be fed with heated air from one of the heat exchanger or the at least one auxiliary combustor and to expand the heated air, and an electric generator, associated with the expander, for producing electric power. The method includes selectively operating the CAES system in at least one of following power production modes:

a) a main power production mode by:
  ensuring that the power generating structure is operable and the at least one auxiliary combustor is inoperable and,
  providing heat from the power generating structure to the heat exchanger and providing compressed air from the air storage to the heat exchanger so that the compressed air received from the air storage is heated in the heat exchanger, with the heat exchanger feeding the heated compressed air to the air expander,
  expanding the heated compressed air in the expander, and
  providing the electric power via the generator in addition to power produced by the power generating structure, or b) a synchronous reserve power mode by:
  ensuring that the power generating structure is inoperable and the at least one auxiliary combustor is operable,
  withdrawing compressed air from the air storage,
  preheating the withdrawn compressed air in the at least one auxiliary combustor that feeds the air expander,
  expanding heated air received from the at least one combustor in the air expander and
  providing substantially immediate start-up power via the generator.

In accordance with another aspect of the invention, a CAES system includes a compressor for supplying compressed air to the air storage, an air storage for storing compressed air, a source of heat, a heat exchanger constructed and arranged to receive heat from the source of heat and to receive compressed air from the air storage, at least one auxiliary combustor for burning fuel and constructed and arranged to receive compressed air from the air storage, an air expander constructed and arranged to be fed with heated air from one of the heat exchanger or the at least one auxiliary combustor and to expand the heated air, and an electric generator, associated with the expander, for producing electric power. The system is constructed and arranged to selectively operate in at least one of the following power production modes of operation:

a) a first power production mode wherein the at least one auxiliary combustor is inoperable, with the heat exchanger receiving heat from the source of heat and receiving compressed air from the air storage so as to heat the compressed air received from the air storage, with the heat exchanger feeding the heated compressed air to the air expander, with the air expander expanding the heated compressed air and the generator providing the electric power, or b) a second, synchronous reserve power production mode wherein the at least one auxiliary combustor is operable and the source of heat is not received by the heat exchanger, with compressed air withdrawn from the air storage being preheated by the at least one auxiliary combustor that feeds the air expander, with the air expander expanding the heated air and the generator providing substantially immediate start-up power.

In accordance with another aspect of the invention, a method of a CAES plant operation includes compressing air and storing wind energy in the form of the compressed air in a supporting tower of a wind power plant. The compressed air released from the supporting tower is preheated to produce heated air. The heated air is supplied to an air expander. The air expander expands the heated air and connected to electric generator for producing power.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DESCRIPTION OF EXAMPLE EMBODIMENTS

Figure 1:
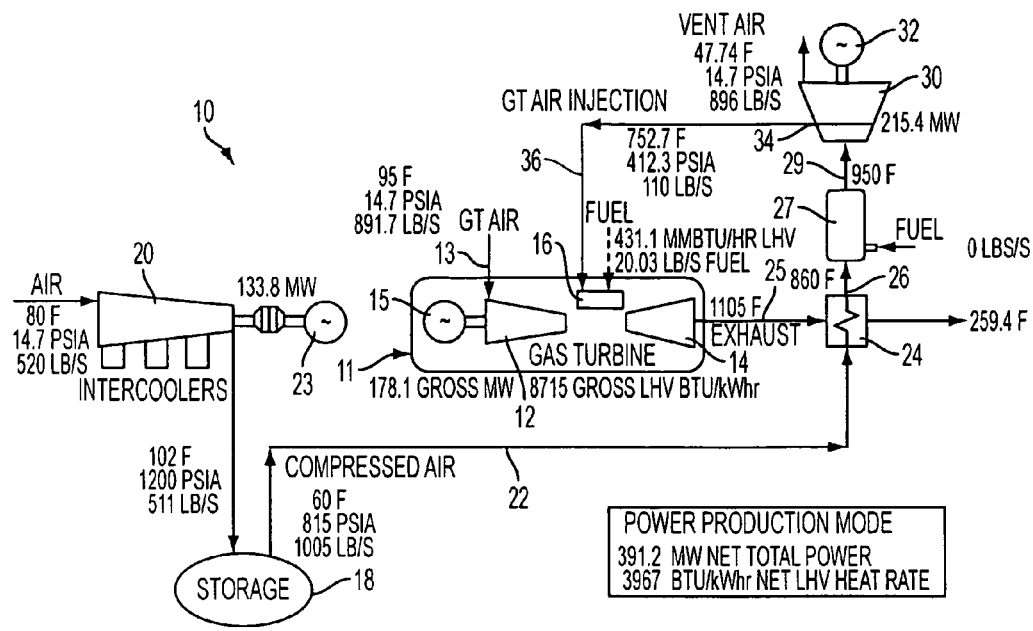
FIG. 1 is a schematic illustration of an example of the typical operation of a CAES system based on my U.S. Pat. No. 7,406,828, with the CAES system based on operating a combustion turbine assembly wherein during off-peak hours a compressor supplies compressed air to an air storage, and during peak hours the compressed air withdrawn from the air storage is preheated in a heat exchanger utilizing the combustion turbine assembly exhaust heat, and sent to an air expander that expands the preheated air tom provide electric power generated by the compressed air, with a fraction of expander's airflow being extracted from the expander and injected upstream of the combustors of the combustion turbine assembly for power augmentation of combustion turbine. The total electric power is the power of the compressed air driven expander plus the power of augmented combustion turbine. It is noted that auxiliary combustor 27 is a component added to the system of 7,406,828 and is used in a synchronous reserve power generation mode as described below.

With reference to FIG. 1, a CAES system is shown, generally indicated as 10, in accordance with an embodiment. The system 10 includes a power generating structure, generally indicated at 11, in the form of a conventional combustion turbine assembly having a main compressor 12 receiving, at inlet 13, a source of inlet air at ambient temperature and feeding at least one main combustor 16 with the compressed air, a main expansion turbine 14 operatively associated with the main compressor 12, with the at least one main combustor 16 feeding the main expansion turbine 14, and an electric generator 15 for generating electric power.

As shown in FIG. 1, the system 10 also includes an air storage 18 that during off-peak hours stores air that is compressed preferably by at least one auxiliary compressor 20. In the embodiment, the auxiliary compressor 20 is driven by a motor 23, but can be driven by an expander or any other source. The auxiliary compressor 20 supplies compressed air to the air storage 18 preferably during off-peak hours. Although a single compressor 20 is shown, the air storage 18 can be supplied by multiple compressors or with compressed air from any source of air compression.

An outlet 22 of the storage 18 is preferably connected with a recuperator or heat exchanger 24. The heat exchanger 24 receives the exhaust gas 25 from the main expansion turbine 14. Thus, the combustion turbine assembly 11, in addition to generating the electric power, provides a source of heat.

Instead, or in addition to the exhaust gas 25 from the expansion turbine 14 of the combustion turbine assembly 11, the heat exchanger 24 can receive any externally available source of heat, as will be explained more fully below. An outlet 26 of the heat exchanger 24 is connected to at least one auxiliary combustor 27, with an outlet 28 of the combustor 27 being connected to an air expander 30 that is connected to an electric generator 32.

In accordance with the embodiment, in a main power production mode of operation of the system 10, preferably during peak hours, and with the auxiliary combustor 27 inoperable, compressed air from the storage 18 is directed to the heat exchanger 24 that receives heat from the source of heat (e.g., exhaust of turbine 14). The heated air is expanded through the expander 30 that is connected to the electric generator 32 and produces the electric power generated by the compressed air in addition to the combustion turbine assembly power. The airflow of expander 30 is a subject for optimization and driven by the required compressed air generated power. The expander 30 has a provision for an extracted airflow flow with parameters consistent with the requirements of the air injection power augmentation technology determined by combustion turbine assembly limitations and can be a subject of optimization. In other words, the injection flow parameters of the injected airflow are consistent with flow parameters of the main compressor 12 at an injection point. Thus, injection can be limited or restricted under certain conditions. For example, based on combustion turbine manufacturer published data, injection at low ambient temperatures may not be permitted or possible, or injection may not be permitted or possible due to accessibility to injection points, or injection may not occur due to operational judgments. The extracted airflow is injected via structure 36 into the combustion turbine assembly 11 preferably upstream of the at least one main combustor 16 with a combustion turbine maximum power augmentation of approximately up to 20-25%. The remaining airflow in the expander 30 is expanded though low pressure stages to atmospheric pressure. Thus, when injection is possible or desired, not all airflow from the expander 30 is exhausted to atmospheric pressure.

Figure 2:
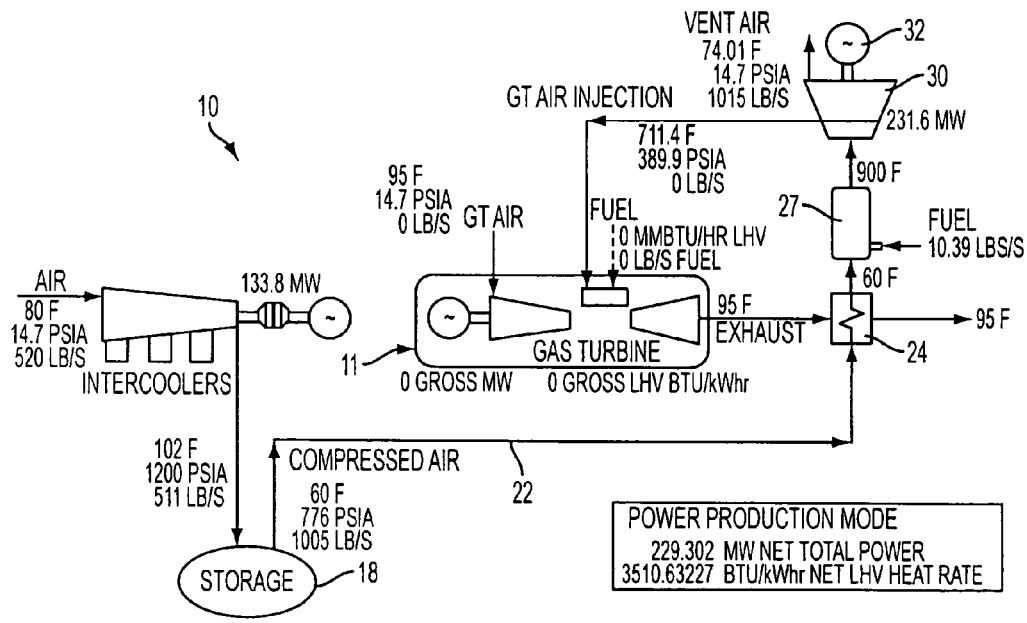
FIG. 2 is a schematic illustration of the CAES system presented in FIG. 1 but operating in a synchronous reserve power generation mode without operating the combustion turbine assembly, but utilizing an additional combustor to increase the inlet temperature of the compressed air feeding the expander. The total electric power is generated by the compressed air driven expander only.

FIG. 2 shows a synchronous reserve power mode of operation of the system 10 of FIG. 1. In this mode, the at least one combustor 27 is operable and the combustion turbine assembly 11 is not operable. Furthermore, since the combustion turbine assembly 11 is not operable, the heat exchanger 24 is not receiving exhaust heat in this mode of operation. Thus, compressed air is withdrawn from the storage 18 and is preheated by the at least one auxiliary combustor 27, for burning fuel, that feeds the expander 30. The heated air is expanded though the expander 30 that is connected to the electric generator 32 for substantially immediate start-up for synchronous reserve power operation, independent of the combustion turbine assembly 11 operation.

Figure 3:
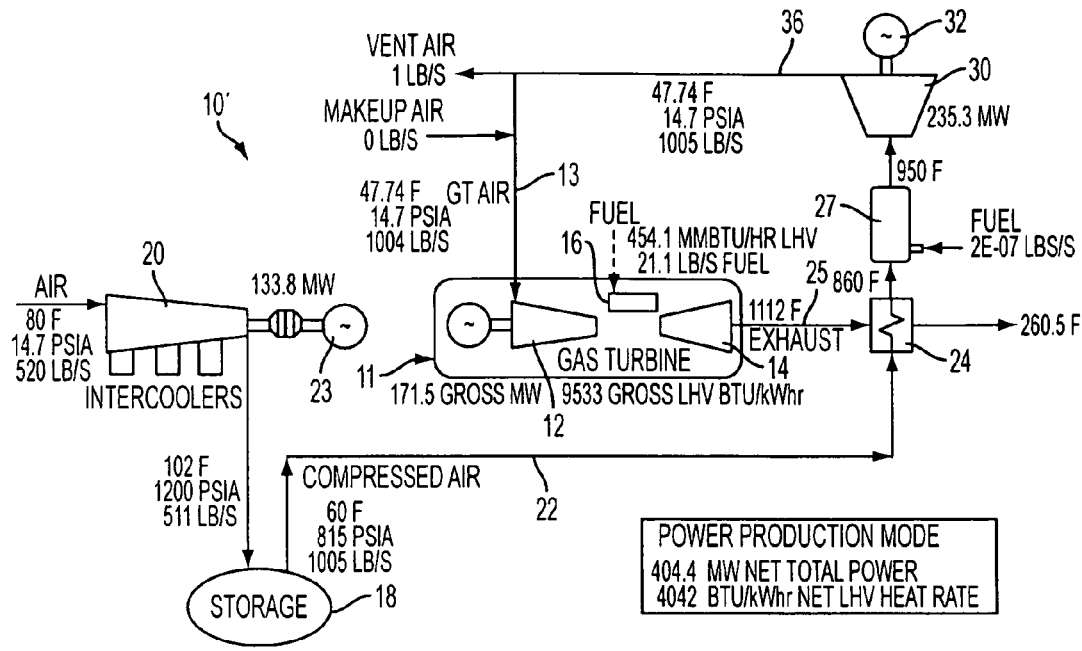
FIG. 3 is a schematic illustration of an example of the typical operation of the CAES system based on my U.S. Pat. No. 7,389,644, with CAES system based on operating a combustion turbine assembly wherein during off-peak hours compressor supplies compressed air to an air storage, and during peak hours the compressed air withdrawn from the air storage is preheated in a heat exchanger utilizing the combustion turbine assembly exhaust heat, and sent to an air expander with expanded exhaust flow having lower than ambient temperature being mixed with inlet flow to the combustion turbine assembly for power augmentation of combustion turbine. The total electric power is the power of the compressed air driven expander plus the power of augmented combustion turbine. It is noted that auxiliary combustor 27 is a component added to the system of 7,389,644 and is used in a synchronous reserve power generation mode as described below.

With reference to FIG. 3, a CAES system which is shown, generally indicated as 10', in accordance with another embodiment. The system 10' includes the same components as in FIG. 1. In a main power production mode of operation of the system 10', preferably during peak hours, and with the auxiliary combustor 27 inoperable, compressed air is withdrawn from the storage 18 and directed to the heat exchanger 24 that receives heat from the source of heat (e.g., exhaust of turbine 14). The heated air is expanded through the expander 30 that is connected to the electric generator 32 and produces the electric power generated by the compressed air in addition to combustion turbine assembly power. Since the expander 30 reduces the pressure of the compressed air, the temperature of the compressed air is reduced. Thus, cold (lower than ambient temperature) air of the expander 30 exhaust is mixed, via structure 36, with the ambient air at inlet 13, reducing the overall temperature of the inlet air prior to being received by the main compressor 12. In the embodiment, the structure 36 is piping connected between an exhaust of the expander 30 and the inlet 13 to the main compressor 12. The airflow of expander 30 is a subject for optimization and driven by the required compressed air generated power. It can be appreciated that instead of all exhaust of the expander 30 being mixed with ambient inlet air, only a portion of the exhaust of the expander 30 can be mixed with the ambient inlet air, by connection the piping 36 to a stage of the expander 30, with the remainder being exhausted to atmosphere.

Figure 4:
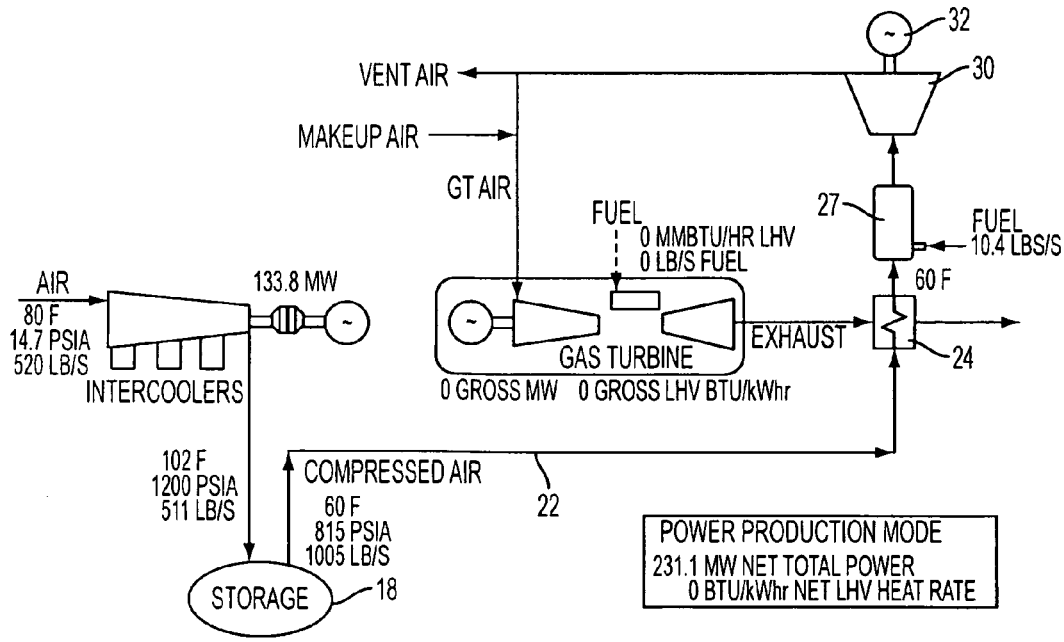
FIG. 4 is a schematic illustration of the CAES system presented in FIG. 3 but operating in a synchronous reserve power generation mode without operating the combustion turbine assembly, but utilizing an additional combustor to increase the expander inlet temperature. The total electric power is generated by the compressed air driven expander only.

FIG. 4 shows a synchronous reserve power mode of operation of the system 10' of FIG. 3. In this mode, the at least one auxiliary combustor 27 is operable and the combustion turbine assembly 11 is not operable. Furthermore, since the combustion turbine assembly 11 is not operable, the heat exchanger 24 is not receiving exhaust heat in this mode of operation. Thus, compressed air is withdrawn from the storage 18 and is preheated by the at least one auxiliary combustor 27 that feeds the expander 30. The heated air is expanded though the expander 30 that is connected to the electric generator 32 for immediate start-up for synchronous reserve power requirements independent of the combustion turbine assembly 11 operation.

Figure 5:
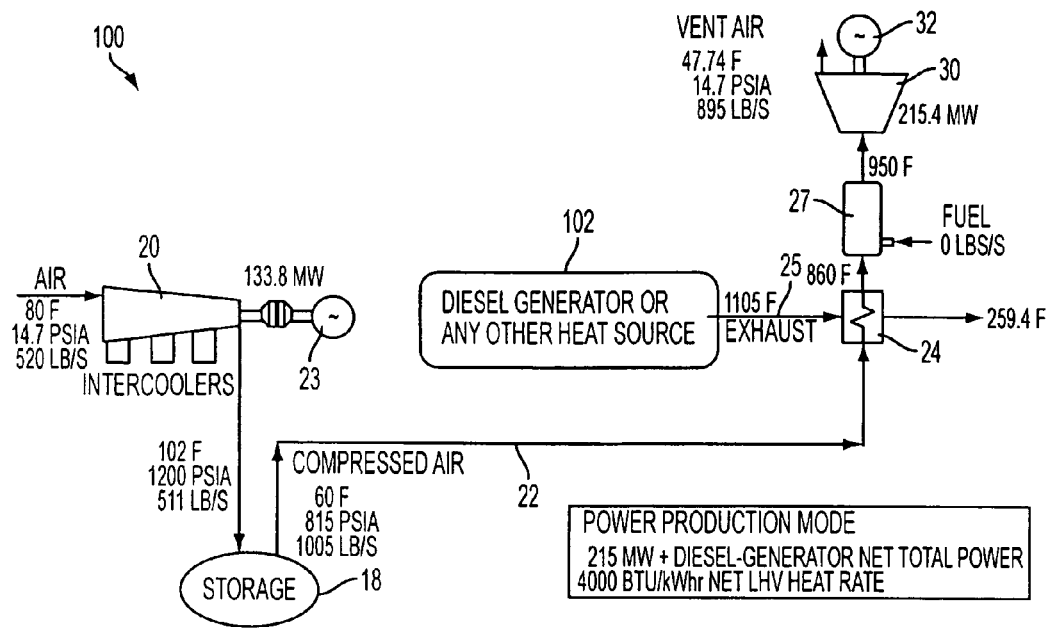
FIG. 5 is a schematic illustration of an distributed power generation system wherein during off-peak hours a compressor supplies compressed air to an air storage, and the compressed air withdrawn from the air storage is preheated by a diesel generator exhaust heat or any source of heat, and is sent to an air expander that generates electric power.

With reference to FIG. 5, a CAES system which is shown, generally indicated as 100, in accordance with another embodiment of the present invention. The system 100 is similar to the systems of FIGS. 1 and 3, but, for distributed power generation applications, the combustion turbine assembly 11 is replaced with a diesel generator 102 or any other power producing structure that provides a heat source, or any source of heat. The exhaust 25 of the power producing structure 102, or any heat source is received by the heat exchanger 24. Thus, in a main power producing mode of operation, the stored compressed air withdrawn from the storage 18, is preheated in the heat exchanger 24 by utilizing the diesel generator 102 exhaust gas heat (or the heat from another power producing heat source or heat from any heat source) and is then directed into the expander 30 that generates the compressed air power in addition to power provided by the diesel generator 102. In this mode, the combustor 27 is not operable.

The system 100' can also operate in a synchronous reserve power mode of operation when the diesel generator 102 or other power producing structure is not operable and with the at least one combustor 27 operable, in a manner similar to that discussed above with regard to FIGS. 2 and 4.

Figure 6:
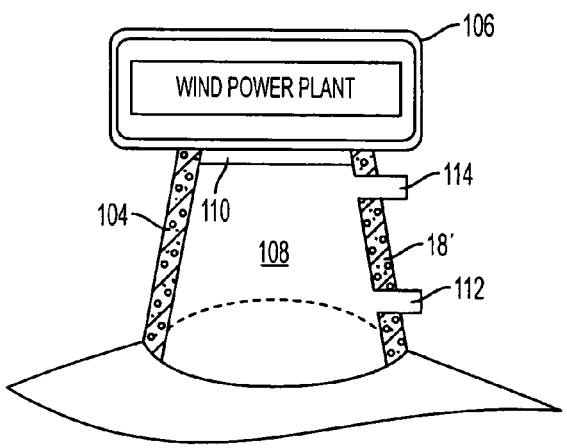
FIG. 6 is a sectional view of an example of concrete tower of a wind power plant for storing compressed air.

The air storage 18 can be a below ground storage in various geological formations or above ground storage in pressure vessels/piping that are significantly more expansive than underground storages. Since one of the prime functions of a CAES plant is associated with load management of wind power plants, in accordance with an embodiment of FIG. 6, the air storage 18' can be the supporting tower 104 of a wind power plant 106. Wind power plants are typically installed on the top of the supporting concrete towers 104 with significant diameter e.g., 10-20 feet and wall thickness 2-3 feet to support the weight and stresses of the wind power plant and to provide an internal chamber 108 for maintenance and support operations. To store compressed air, the chamber 108 shall be slightly modified to provide appropriate seals 110 especially at a top thereof. Thus, the supporting towers 104 can be utilized for the compressed air storage replacing typical underground storage or the storage of the compressed air in the above ground pressure vessels/piping. Preferably during the off-peak power hours without usage requirements, the wind energy, in the form of the compressed air, will be sent to inlet 112/114 of the supporting tower 104 and be stored inside the tower 104. If maintenance is required, the compressed air can be removed from the tower 104. During peak power hours, the stored compressed air can be directed from exit 112/114 of the supporting tower, be preheated and sent to expanders for generation of the more needed and higher price energy for example, in the manner discussed above with regard to FIGS. 1 and 3.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of operating a Compressed Air Energy Storage (CAES) system, the system including an air storage for storing compressed air, an auxiliary compressor for supplying compressed air to the air storage, a power generating structure, a heat exchanger constructed and arranged to receive heat from the power generating structure and to receive compressed air from the air storage, at least one auxiliary combustor constructed and arranged to receive compressed air from the air storage, an air expander constructed and arranged to be fed with heated air from one of the heat exchanger or the at least one auxiliary combustor and to expand the heated air, and an electric generator, associated with the expander, for producing electric power, the method including selectively operating the system in one of the following power production modes of operation:
  a) a main power production mode by:
    ensuring that the at least one auxiliary combustor is inoperable and the power generating structure is operable,
    providing heat from the power generating structure to the heat exchanger and providing compressed air from the air storage to the heat exchanger so that the compressed air received from the air storage is heated in the heat exchanger, with the heat exchanger feeding the heated compressed air to the air expander,
    expanding the heated compressed air in the expander, and
    providing the electric power via the generator in addition to power produced by the power generating structure, or
  b) a synchronous reserve power mode by:
    ensuring that the at least one auxiliary combustor is operable and the power generating structure is inoperable,
    withdrawing compressed air from the air storage,
    preheating the withdrawn compressed air in the at least one auxiliary combustor that feeds the air expander,
    expanding heated air received from the at least one combustor in the air expander, and
  providing substantially immediate start-up power via the generator.

2. The method of claim 1, wherein the power generating structure is a combustion turbine assembly including a main compressor constructed and arranged to receive ambient inlet air, a main expansion turbine operatively associated with the main compressor, at least one main combustor constructed and arranged to receive compressed air from the main compressor and to feed the main expansion turbine, and an electric generator associated with the main expansion turbine for generating electric power, and
  wherein the step of providing heat to the heat exchanger includes providing exhaust heat from the main expansion turbine of combustion turbine assembly.

3. The method of claim 1, wherein the power generating structure is a diesel generator, and
  wherein step of providing heat to the heat exchanger includes providing exhaust gas heat from the diesel generator of the power generation structure.

4. The method of claim 1, further including operating the auxiliary compressor to supply compressed air to the air storage during off-peak hours.

5. The method of claim 1, wherein the power generating structure is a combustion turbine assembly including a main compressor constructed and arranged to receive ambient inlet air, a main expansion turbine operatively associated with the main compressor, at least one main combustor constructed and arranged to receive compressed air from the main compressor and to feed the main expansion turbine, and an electric generator associated with the main expansion turbine for generating electric power,
  wherein in the main power production mode of operation, compressed air withdrawn from the air storage is preheated in the heat exchanger by receiving exhaust from the main expansion turbine and is sent to the air expander to expand the heated compressed air to exhausted atmospheric pressure for producing the electric power, and at least a portion of airflow extracted from the air expander is injected, under certain conditions, into the combustion turbine assembly increasing power of the combustion turbine assembly.

* * * * *